(12) United States Patent
Sbaiz et al.

(10) Patent No.: US 9,253,269 B1
(45) Date of Patent: Feb. 2, 2016

(54) AUTOMATIC AUDIENCE CREATION FOR SHARED CONTENT

(71) Applicant: Google Inc., Mountain View, CA (US)

(72) Inventors: Luciano Sbaiz, Thalwil (CH); Effrosyni Kokiopoulou, Adliswil (CH); Dimitre Trendafilov, Zurich (CH); Jesse Berent, Kusnacht (CH)

(73) Assignee: GOOGLE INC., Mountain View, CA (US)

( * ) Notice: Subject to any disclaimer, the term of this patent is extended or adjusted under 35 U.S.C. 154(b) by 223 days.

(21) Appl. No.: 13/789,310

(22) Filed: Mar. 7, 2013

(51) Int. Cl.
*G06F 15/173* (2006.01)
*H04L 29/08* (2006.01)

(52) U.S. Cl.
CPC ...................... *H04L 67/22* (2013.01)

(58) Field of Classification Search
CPC ............................... H04L 67/20; H04L 67/22
USPC ................................................. 709/223, 224
See application file for complete search history.

(56) References Cited

U.S. PATENT DOCUMENTS

2006/0064411 A1* 3/2006 Gross et al. ...................... 707/3
2009/0222551 A1* 9/2009 Neely et al. ................... 709/224

* cited by examiner

*Primary Examiner* — Adnan Mirza
(74) *Attorney, Agent, or Firm* — Lowenstein Sandler LLP

(57) ABSTRACT

A system for creating audiences for a shared content publisher, includes a data store comprising a computer readable medium storing a program of instructions for audiences for a shared content publisher; a processor that executes the program of instructions; a data processor to monitor access to an Internet web site by a first set of users for a reference time period; a window extraction module, based on a reference split period, to divide the monitored access into a vector X and a vector Y, wherein vector X is defined by accesses by the first set of users before the reference split period, and vector Y is defined by accesses by the first user after the reference split period; and a data analysis module to create a model based on the vector X and the vector Y, to evaluate the model based on a second set of users accessing content similar to vector X, to create a final model based on the evaluation, and to score a group of users associated with the shared content publisher based on the final model, the data processor monitors accesses by the first user by recording content or shared content identification and additional information items.

20 Claims, 3 Drawing Sheets

AUTOMATIC AUDIENCE CREATION FOR SHARED CONTENT

BACKGROUND

Internet web sites serve content, such as pictures, videos, text, to various users who access the Internet web site. The content may be sourced from a publisher, automatically generated, or from one of the various users. The Internet web site may store the content, or link to various other web sites that serve the content.

The Internet web site may augment the serving of the content with shared content. The shared content may be presented before, during and after the presentation of the content. The shared content may be associated with meta information, and when the shared content is clicked through by a user, the user of the Internet web site may be redirected to additional content associated with the shared content.

The shared content may provide information associated with a product or service related to the content. The shared content may be served to a user based on an algorithm employed by the Internet web site, to match with previous knowledge or activities associated with the user.

A user may be served shared content from the Internet web site based on prior activities. For example, if a content publisher maintains a group of videos stored and available on the Internet web site, and the user has clicked or viewed one of the publisher's videos, the user may be served shared content sourced from the publisher based on the user's previous activities.

A user may be served shared content based on the user's similarity to another user. For example, if the user's viewing preferences match or are similar to another user's viewing preferences, the user may be served shared content based on the other user's click through history.

Other techniques employ keyword and interest metrics. The Internet web site may serve shared content based on a keyword search that a user employs to find and retrieve content. Additionally, the content viewed by the user may be associated with a specific interest or category. The Internet web site may serve shared content based on the specific interest or category.

SUMMARY

A system for creating audiences for a shared content publisher, includes a data store comprising a computer readable medium storing a program of instructions for audiences for a shared content publisher; a processor that executes the program of instructions; a data processor to monitor access to an Internet web site by a first set of users for a reference time period; a window extraction module, based on a reference split period, to divide the monitored access into a vector X and a vector Y, wherein vector X is defined by accesses by the first user before the reference split period, and vector Y is defined by accesses by the first set of users after the reference split period; and a data analysis module to create a model based on the vector X and the vector Y, to evaluate the model based on a second set of users accessing content similar to vector X, to create a final model based on the evaluation, and to score a group of users associated with the shared content publisher based on the final model, the data processor monitors accesses by the first user by recording content or shared content identification and additional information items.

DESCRIPTION OF THE DRAWINGS

The detailed description refers to the following drawings, in which like numerals refer to like items, and in which:

FIG. 3 illustrates an example of a method for creating an audience for serving shared content to.

DETAILED DESCRIPTION

An Internet web site operator may employ techniques for improving the click through rate of shared content served along with content. The Internet web site may monetize the serving of shared content, and thus recover compensation commensurate by the amount of times the shared content is clicked through. Alternatively, the shared content may be provided with a 'skip' function that allows the user to skip the viewing of the shared content after a predetermined amount of the time. The compensation associated with the shared content may be set commensurate on the amount of times the user does not 'skip', and thus watches all of the shared content. If a user watches all of the shared content, this may be classified as a 'view'.

Disclosed herein are techniques for creating an audience for serving shared content to. The techniques discussed herein employs data collection associated with various users interaction with shared content over a time period, with the data being cross referenced with predicted behavior compared with actual behavior. Thus, a learning model is created based on prior usage associated with various users and shared content from specific publishers.

By providing an automatic creation of an audience for a publisher's shared content, the onus of creating an audience is removed from the publisher. Further, by utilizing the techniques herein, the publisher may realize shared content with greater rates of click through, and more views. Thus, a publisher's shared content is less likely to be delivered to a user who is not interested in the shared content.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
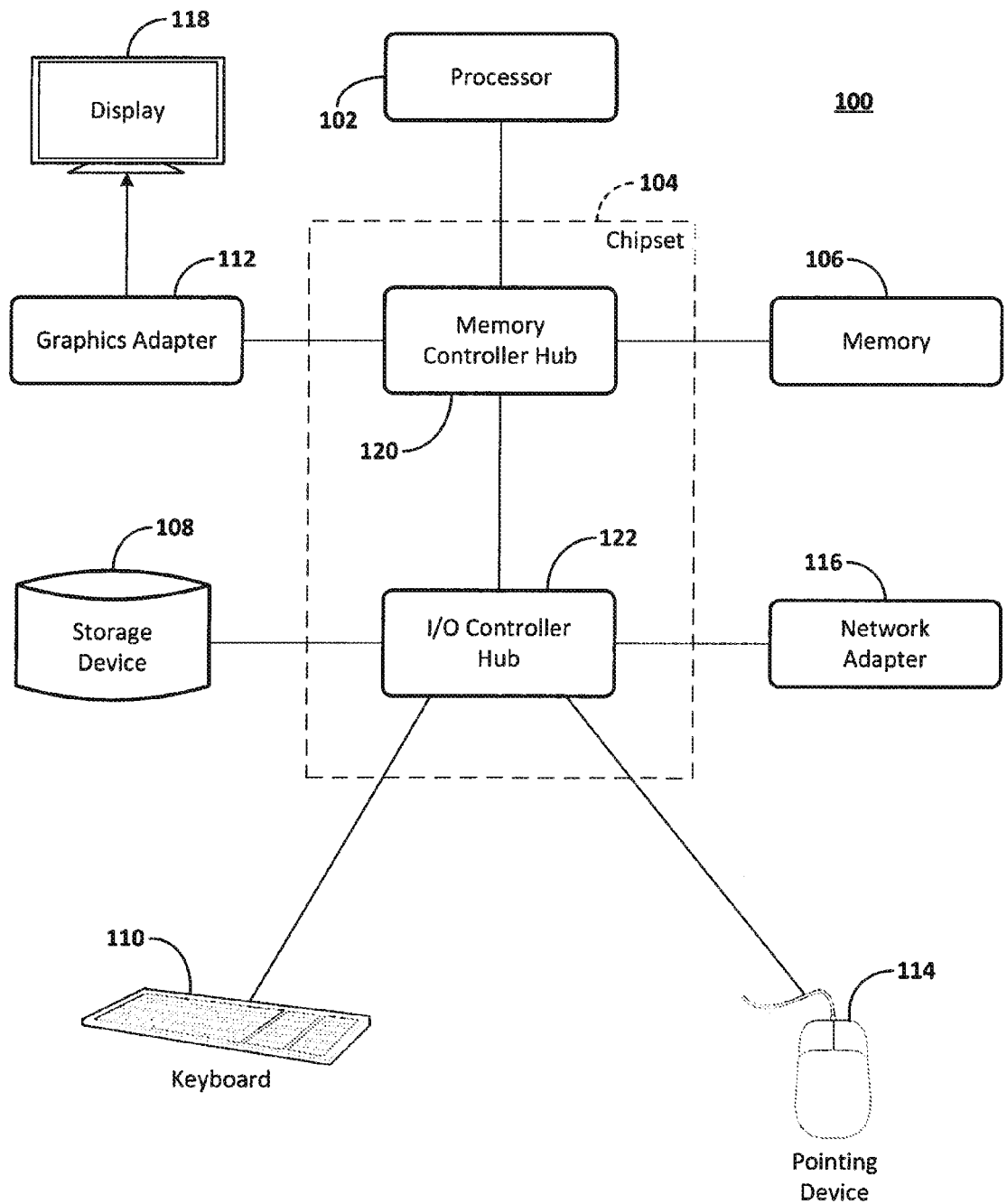
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
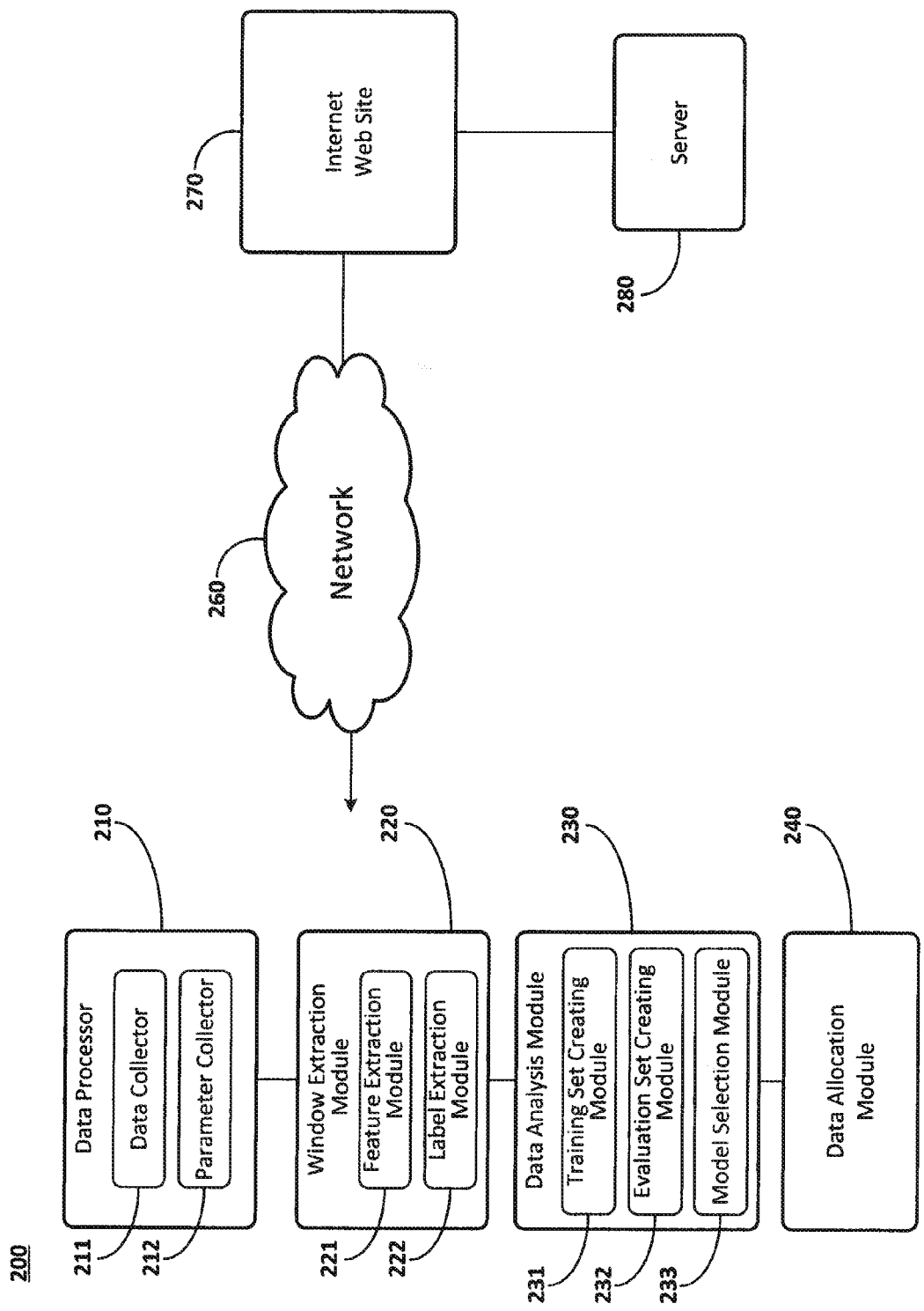
FIG. 2 illustrates an example of a system for creating audiences for shared content publishers.

FIG. 2 illustrates an example of a system for creating audiences for shared content publishers. The system 200 includes a data processor 210, a window extraction module 220, a data analysis module 230, and a data allocation module 240. As illustrated in FIG. 2, the system 200 communicates via network 260 to an Internet web site 270. The Internet web site 270 may be stored on an Internet web site server 280. Alternatively, the system 200 may be implemented on the Internet web site server 280.

The data processor 210 includes a data collector 211 and a parameter collector 212. The data collector 211 monitors accesses to the Internet web site 270 over a time period. The time period may be predetermined based on available resources and the accuracy desired by an operator of system 200. The data collector 211 records various users' access of content and shared content served by the Internet web site 270. The recordation is performed for each user. Thus, data recorded may be segregated and analyzed on a per user basis. The data collector 211 also records when a user views or skips shared content.

The parameter collector 212 records additional information in association with each users' access. The additional information may augment the data collected by the data collector 211. The additional information may include a publisher associated with the viewed shared content, a title or identification associated with the viewed shared content, and the categories associated with the viewed shared content. Further, the parameter collector 212 may record numerical data associated with the user or the views, such as the number of times the user viewed the shared content, the number of the times the user skipped the shared content, the number of content items accessed by the user, for example.

The window extraction module 220 includes a feature window module 221 and a label window module 222. A predefined point may be selected by an operator of system 200 that splits the time period in which data is collected by the data collector 211 into two parts. Thus, the data associated with the first part is collected by the feature window module 221, and the data associated with the second part is collected by the label window module 222. For example, if the total time period for the collection of data performed by data collector 211 is 3 weeks, and the predefined point to split the time period is the last day of data collection, the feature extraction window is set to be 3 weeks excluding the last day, and the label extraction window is set to be the last day that data was collected.

The data associated with the feature extraction window may be assigned to vectors X, while the data associated with the label extraction window may be assigned to vectors Y. The vectors X may serve as a concatenation of the parameters recorded by the parameter collector 212. Additionally, each vector Y may be associated with a shared content identification, or the shared content publisher.

Based on the collection of vectors for the feature extraction window and the label extraction window, relationships may be established. Thus, if certain aspects associated with a collection of features lead to a specific vector Y, a relationship may be set. For example, if a user views content directed towards dogs (during the feature extraction window), and does not skip shared content directed towards dog toys (during the label extraction window), the system 200 establishes a relationship between the vector X associated with the content (the video directed toward the dog) and the vector Y (the video directed toward dog toys).

The data analysis module 230 includes a training set creating module 231 and an evaluation set creating module 232. The training set creating module 231 observes data on an Internet web site 270 over the time period, and creates a model based on patterns observed between content and shared content. For example, if a user accesses content about travelling, and then later accesses shared content about shoes, the training set creating module 231 creates a model relating travelling to shoes.

Once the models have been created, a vector X associated with content is compared to a vector Y associated with shared content for each user based on the created models. The training set creating module 231 establishes how accurate the model is by determining if the content associated with vector X leads to the shared content associated with vector Y. The amount of times the relationship between vector X and vector Y satisfies the relationship established by the created model is labeled as the probability of the model.

The evaluation set creating module 232 utilizes the models created by the training set creating module 231 and applies the models to a different set of users. The evaluation set creating module 232, for each user, records accesses that correspond to vector X, and using the created models, predicts which shared content associated with vector Y the user will access. The evaluation set creating module 232 records the actual shared content that the user accesses. If the actual shared content matches the shared content associated with vector Y (i.e. the predicted shared content), the evaluation set creating module 232 scores the model as successful.

The model selection module 233 determines a final model to use by selecting a combination of models deemed successful by the evaluation set creation module 232. In this way, the system 200 may determine that a user associated with vector X is likely to view shared content from a publisher associated with vector Y based on the final model. The model selection module 233 may assign a score associated with each user in regards to a specific publisher.

The data allocation module 240 allows the system 200 to refine matches between publishers and users. For example, the system 200 may limit the number of users who may be associated with a specific publisher by limiting the number or users or by dictating that a user has a score equal to or greater than a predefined threshold.

Further, the system 200 may limit the number of publishers associated with a specific user. One such way the system 200 may limit this is by providing a right to the publisher to serve shared content to a specific user via a bid. Thus, the publisher with the largest bid total obtains rights to serve shared content with the specific user.

Figure 3:
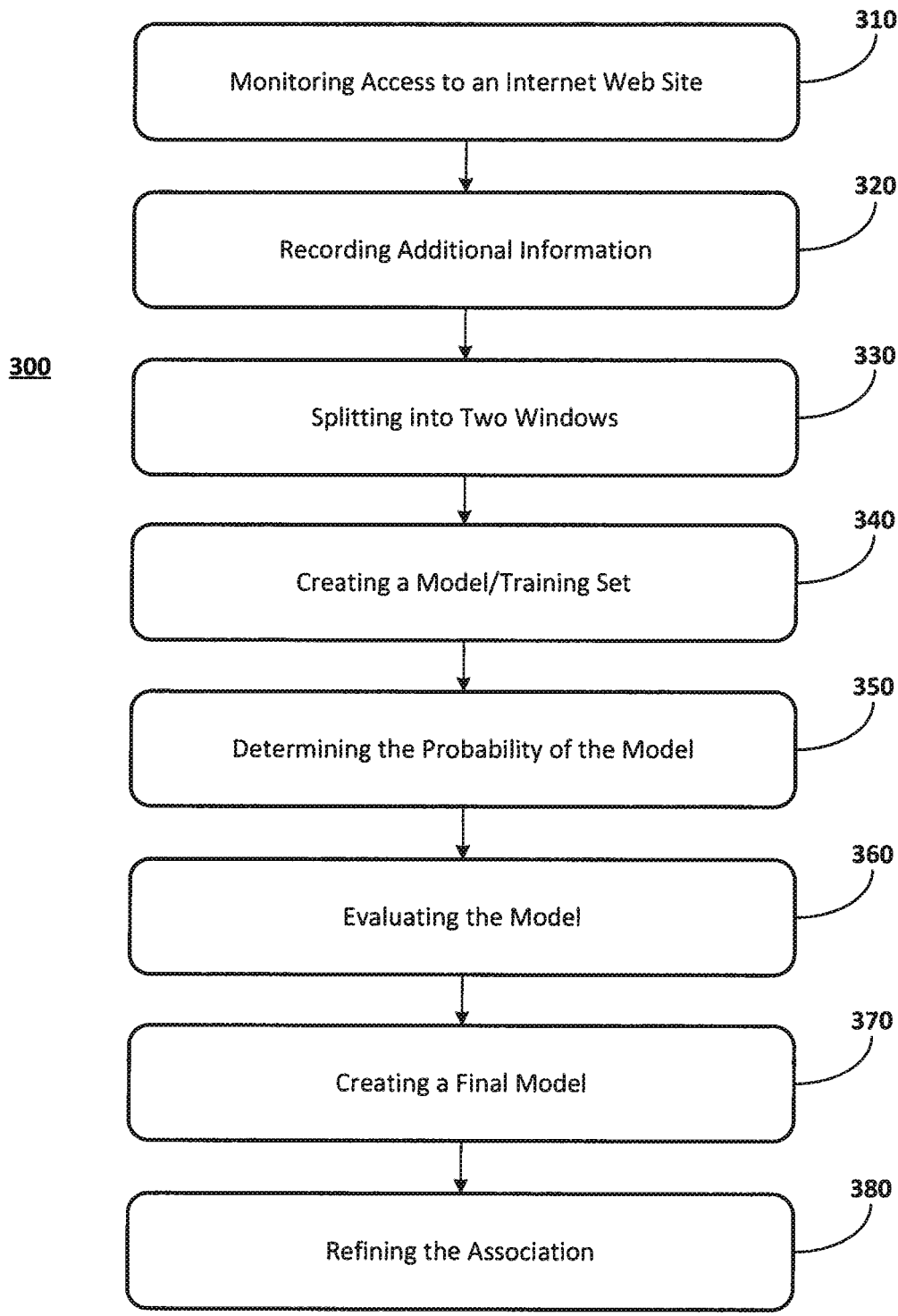

FIG. 3 illustrates an example of a method 300 for creating an audience for serving shared content to. The method 300 may be implemented on the system 200 depicted in FIG. 2.

In operation 310, the system 200 monitors accesses to the Internet web site 270 over a time period. The time period may be predetermined based on available resources and an accuracy desired by an operator of system 200. In operation 310, various users' access of content and shared content served by the Internet web site 270 is also recorded. The recordation is performed for each user. Thus, data recorded may be segregated and analyzed on a per user basis. Further, the recorded data indicates when a user views or skips shared content. The method 300 may be configured to record data for a predefined subset of users and time period.

In operation 320, based if a view was recorded by a user, additional information may be recorded to augment the data stored in operation 310. For example, the additional information may include a publisher associated with the viewed shared content that was viewed, a title or identification associated with the viewed shared content, and the categories associated with the viewed shared content. Further, the system 200 may record numerical data associated with the user or the views, such as the number of times the user viewed the shared content, the number of the times the user skips the shared content, the number of content items accessed by the user, for example. The data collected in operation 320 may be aggregated in a histogram associated with one user session.

In operation 330, the data collected in operation 320 is split into two parts, a feature extraction window and a label extraction window. The feature extraction window may be a predetermined time period associated with the data collection of operations 310 and 320, and occur prior to the label extraction window. The label extraction window may be a predetermined time period that occurs after the time period associated with the feature extraction window. For example, if the total time period for the data collection performed in operations 310 and 320 occur from 3 weeks, the feature extraction window may be set to be 3 weeks excluding the last day, and the label extraction window may be set to the last day that data was collected.

The data associated with the feature extraction window may be assigned to vectors X, while the data associated with the label extraction window may be assigned to vector Y. The vectors X may serve as a concatenation of the parameters recorded in operation 320. Additionally, each vector Y may be associated with a shared content identification, or the shared content publisher.

Based on the collection of vectors for the feature extraction window and the label extraction window, relationships may be established. Thus, if certain aspects associated with a vector X associated with recorded parameters in operation 320 leads to shared content associated with a specific vector Y, a relationship may be set. For example, if a user views content directed towards dogs (during the feature extraction window), and views shared content directed towards dog toys (during the label extraction window), a relationship between the vector X associated with the content (the video directed toward the dog) and the vector Y (the video directed toward dog toys) may be established.

In operation 340, a model is created using a training set. The training set is an observation of data on the Internet web site 270 over a time period. The model is created based on patterns observed between content and shared content. For example, if various users access content about travelling, and then later access shared content about shoes, a model relating travelling to shoes is created.

Once the models have been created, a vector X associated with content is compared to a vector Y associated with shared content for each user based on the created models.

In operation 350, a determination of the accuracy of the model is made by determining if the content associated with vector X when accessed by a user leads to the same user accessing the shared content associated with vector Y. The amount of times the relationship between vector X and vector Y satisfies the relationship established by the created model is labeled as the probability of the model.

In operation 360, the model is verified via an evaluation set. The models created in operations 340 and 350 are utilized with a different set of users. Accesses are recorded that correspond to vector X for each user, and using the created models, then predicts which shared content associated with vector Y the user will access. The actual shared content that the user access is recorded. If the actual shared content matches the shared content associated with vector Y (i.e. the predicted shared content), the model is scored as successful.

In operation 370, a final model is selected. The final model is selected by using a combination of models deemed successful in operation 360. In this way, a determination is made if a user associated with vector X is likely to view shared content from a publisher associated with vector Y. After the final model is selected, a score may be assigned with each user in regards to a specific publisher.

In operation 380, matches between publishers and various users may be refined. For example, the number of users associated with a specific publisher may be limited by dictating that a user has a score equal to or greater than a predefined threshold.

Further, the number of publishers associated with a specific user may also be limited. One such way the system 200 may limit this is by providing a right to the publisher to serve shared content to a specific user via a bid. Thus, the publisher with the largest bid total obtains rights to serve shared content with the specific user.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for creating audiences for a first shared content publisher, comprising:
 a data store; and
 a processor, coupled to the data store, to:
 monitor access to content of a content hosting platform by a first set of users for a reference time period, the content comprising a plurality of shared content items of a plurality of shared content publishers;
 divide, based on a reference split period, the monitored access into a first part and a second part, wherein the first part is defined by accesses to a first subset of the plurality of shared content items by the first set of users before the reference split period, and the second part is defined by accesses by the first set of users to second subset of the plurality of shared content items after the reference split period, wherein the first subset of the plurality of shared content items is associated with the plurality of shared content publishers, and the second subset of the plurality of shared content items is associated with the first shared content publisher;
 create a model based on the first part and the second part;
 evaluate the model based on a second set of users accessing content similar to content corresponding to the first part;
 create a final model based on the evaluation; and
 score a group of users associated with the first shared content publisher based on the final model.

2. The system according to claim 1, further comprising:
 an allocation module to limit a number of the group of users associated with the first shared content publisher.

3. The system according to claim 1, further comprising:
 an allocation module to limit a number of shared content publishers per user.

4. The system according to claim 3, wherein the shared content publishers are allowed to bid to serve shared content to a specific user.

5. The system according to claim 1, wherein the first part is represented by vector X that is a concatenation of one, some or all of additional information items.

6. The system according to claim 5, wherein the additional information items comprise one or more of:
   a publisher associated with viewed shared content,
   a title or identification associated with the viewed shared content,
   categories associated with the viewed shared content, or
   numerical data associated with views or skips by the first set of users.

7. The system according to claim 1, wherein a data analysis module evaluates the model based on a probability that activity associated with the first part, vector X, leads to activity associated with the second part, vector Y.

8. The system according to claim 1, wherein a data analysis module creates the final model based on a combination of models.

9. The system according to claim 2, wherein the limit is based on the group of users with a respective score above a predefined threshold.

10. The system according to claim 1, wherein the shared content is served to the associated group of users independent of a selection of content by the group of users.

11. A method for creating audiences for a first shared content publisher, comprising:
   monitoring access for a first set of users and a second set of users to content of a content hosting platform over a time period, the content comprising a plurality of shared content items of a plurality of shared content publishers;
   splitting, based on a reference split period, a first set of users' access records into a first part, and a second part, the first part corresponding to accesses to a first subset of the plurality of shared content items by the first set of users before the reference split period, and the second part corresponding to accesses by the first set of users to second subset of the plurality of shared content items after the reference split period, wherein the first subset of the plurality of shared content items is associated with the plurality of shared content publishers, and the second subset of the plurality of shared content items is associated with the first shared content publisher;
   creating, by a processing device, a model based on the first part and the second part;
   evaluating the model based on the second set of users accessing content similar to content corresponding to the first part;
   creating a final model based on the evaluation;
   scoring a group of users based on the final model with respect to the shared content publisher; and
   associating the group of users with the first shared content publisher.

12. The method according to claim 11, further comprising: limiting a number of the group of users associated with the shared first content publisher.

13. The method according to claim 11, further comprising: limiting a number of shared content publishers per user.

14. The method according to claim 13, further comprising: allowing the shared content publishers to bid to serve shared content to a specific user.

15. The method according to claim 11, wherein the first part is represented by vector X that is a concatenation of one, some or all of additional information items.

16. The method according to claim 15, wherein the additional information items comprises one or more of:
   a publisher associated with viewed shared content,
   a title or identification associated with the viewed shared content,
   categories associated with the viewed shared content, or
   numerical data associated with views or skips by the first set of users.

17. The method according to claim 11, wherein evaluating the model is based on a probability that activity associated with the first part, vector X, leads to activity associated with the second part, vector Y.

18. The method according to claim 11, creating the final model based on a combination of models.

19. The method according to claim 12, wherein the limit is based on the group of users with a respective score above a predefined threshold.

20. The method according to claim 11, serving the shared content to the associated group of users independent of a selection of content by the group of users.

* * * * *